US009992517B2

(12) United States Patent
Pinckernell et al.

(10) Patent No.: US 9,992,517 B2
(45) Date of Patent: Jun. 5, 2018

(54) PROVIDING ENHANCED CONTENT BASED ON USER INTERACTIONS

(71) Applicant: Comcast Cable Communications, LLC, Philadelphia, PA (US)

(72) Inventors: Nicholas Adam Pinckernell, Littleton, CO (US); Jonathan Alan Leech, Denver, CO (US); David B Leach, Centennial, CO (US); Edward David Monnerat, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days. days.

(21) Appl. No.: 15/051,006

(22) Filed: Feb. 23, 2016

(65) Prior Publication Data

US 2017/0244986 A1 Aug. 24, 2017

(51) Int. Cl.
*H04N 21/234* (2011.01)
*H04N 21/2343* (2011.01)
*H04N 21/4728* (2011.01)
*H04N 21/6405* (2011.01)
*H04N 21/6408* (2011.01)

(52) U.S. Cl.
CPC . *H04N 21/23418* (2013.01); *H04N 21/23439* (2013.01); *H04N 21/234336* (2013.01); *H04N 21/4728* (2013.01); *H04N 21/6405* (2013.01); *H04N 21/6408* (2013.01)

(58) Field of Classification Search
None
See application file for complete search history.

(56) References Cited

U.S. PATENT DOCUMENTS

| 7,184,647 | B2* | 2/2007 | Kawamura | G11B 19/02 386/248 |
| 7,921,036 | B1* | 4/2011 | Sharma | G06Q 20/3674 705/14.49 |
| 8,086,171 | B2 | 12/2011 | Wang et al. | |
| 2005/0019015 | A1 | 1/2005 | Ackley et al. | |
| 2010/0232504 | A1 | 9/2010 | Feng | |
| 2011/0143769 | A1* | 6/2011 | Jones | G06F 1/1624 455/456.1 |
| 2013/0230293 | A1 | 9/2013 | Boyle et al. | |
| 2014/0219346 | A1* | 8/2014 | Ugur | H04N 19/00575 375/240.12 |
| 2014/0325578 | A1* | 10/2014 | Huang | H04N 21/234309 725/116 |
| 2016/0105428 | A1* | 4/2016 | Schrempp | H04L 65/60 726/7 |
| 2016/0147400 | A1* | 5/2016 | Patten | G06F 3/0484 715/753 |
| 2016/0156949 | A1* | 6/2016 | Hattori | H04N 21/234345 725/109 |

* cited by examiner

*Primary Examiner* — Hoang Vu A Nguyen Ba
(74) *Attorney, Agent, or Firm* — Banner & Witcoff, Ltd.

(57) ABSTRACT

Some of the various features described herein include providing an enhanced view of content. Some content may be cropped or edited for general transmission, and a primary- or second-screen device may be used to receive and view additional views or portions of content that may otherwise be unavailable. For example, if a cropped portion of content is delivered to a device, a different device may be used to view at least a portion of the content that was removed during the cropping process. Another aspect may include providing a higher-resolution version of content to a second-screen device.

20 Claims, 9 Drawing Sheets

800

PROVIDING ENHANCED CONTENT BASED ON USER INTERACTIONS

BACKGROUND

Video capture and presentation technology is always improving. Cameras that capture content are continually increasing in their capacity and ability to capture high quality video, with increasing amounts of detail, such as wide angles and surround capture. Similarly, display devices are improving. Many users today watch video on their televisions, but also on mobile phones, tablets, laptops, projectors, and other display devices. Users may experience content on more than one device, and may use a second device to supplement content displayed on the first device. These and other improvements are identified and presented herein.

SUMMARY

The following summary is for illustrative purposes only, and is not intended to limit or constrain the detailed description.

Some of the features described herein include receiving content, identifying a subset of the content, and transmitting an enhanced view of the subset of the content. Some aspects may include receiving an image that comprises a frame of the subset of the content, and identifying the subset of the content using the received frame. Some aspects may include matching the frame of the subset of the content to a same frame of the content.

Some aspects include capturing content, wherein at least a first subset of the content is used for presentation. Some aspects may further include receiving an identification of a portion of the first subset of the content. Some aspects may further include transmitting an enhanced view of the portion of the first subset of the content. The enhanced view may include a second subset of the content. The second subset of the content may include at least some content of the content different than the first subset of the content.

Some aspects may include capturing video. The video may include a first portion for presentation on a device and a second portion not immediately presented on the device. Some aspects may further include receiving an identification of a part of the first portion of the video. In response to receiving the identification, the second portion may be transmitted, e.g., for presentation, to a different device. The first portion may be presented on the device concurrently with the second portion being presented on the different device.

In some aspects, a second-screen device may be used to zoom in on a portion of content being displayed on a display device, or to view content supplemental to content being presented on the display device. The zoomed-in portion of content may be identified to a server (e.g., the portion of the content or an identification thereof may be transmitted to the server), which may provide supplemental content and/or an enhanced version of the zoomed-in portion of the content. In some embodiments, the display device may display an indication (e.g., a box overlay) with the content, the indication corresponding to the portion of the content being displayed on the second-screen device.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
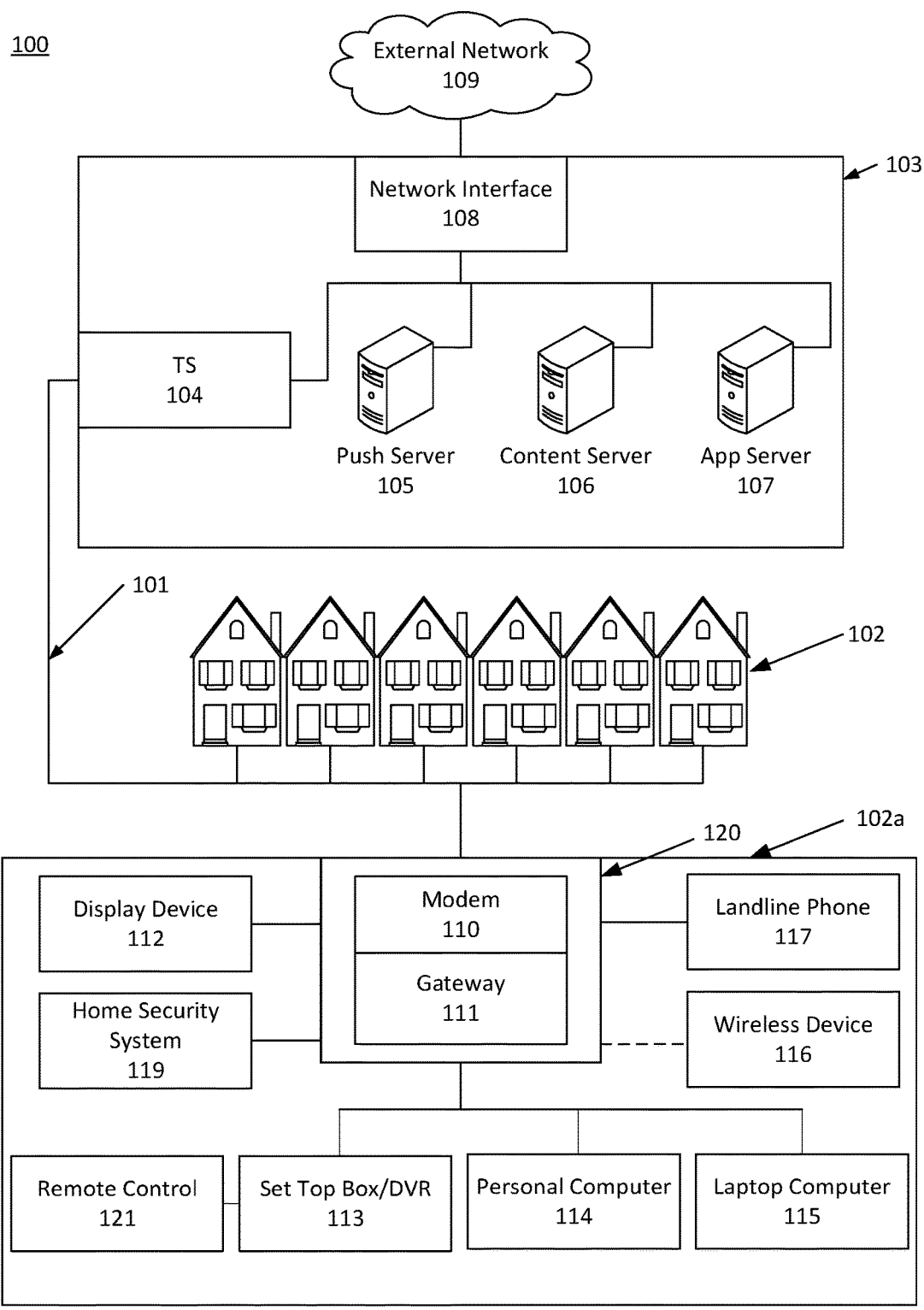
FIG. 1 illustrates an example communication network on which various features described herein may be implemented.

FIG. 1 illustrates an example communication network 100 on which some of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect various premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) or device(s).

The local office 103 may also include one or more application servers 107. An application server 107 may be one or more computing devices configured to offer any desired service, and may run various languages and operating systems (e.g., servlets and JSP pages running on the TOMCAT platform, the MYSQL programming language, the OSX platform, the BSD platform, the UBUNTU platform, the REDHAT platform, the HTML5 programming language, the JAVA programming language, the AJAX platform and the COMET programming language). For example, an application server may be responsible for collecting television program listings information and generating a data download for electronic program guide listings. Another application server may be responsible for monitoring user viewing habits and collecting that information for use in selecting advertisements. Still, another application server may be responsible for receiving and transmitting communications related to a security system in accordance with the present disclosure. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, which may include security system access information, restrictions, and access logs as a result of performing steps described herein.

An example premises 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), home security system 119, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

Figure 2:
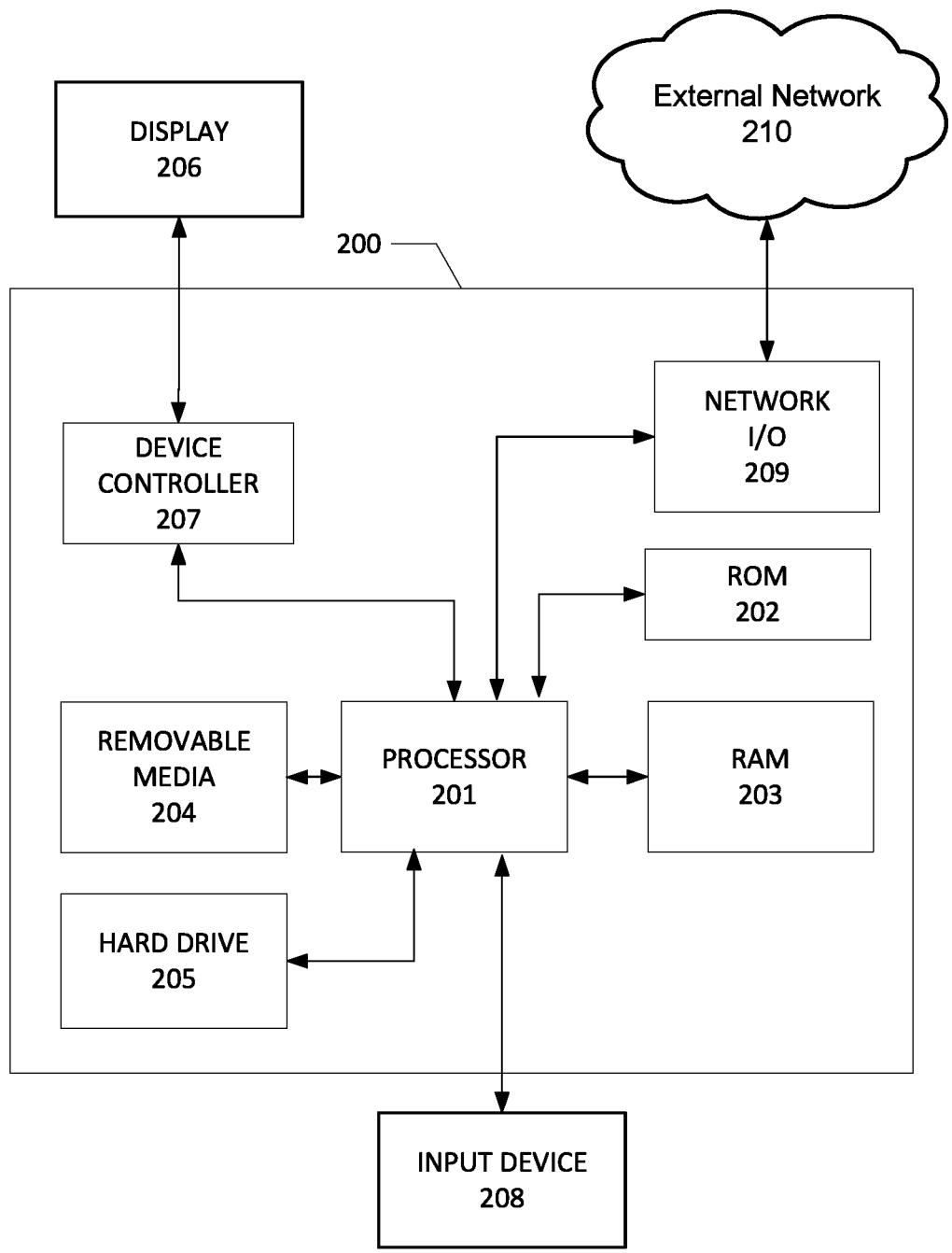
FIG. 2 illustrates an example computing device that may be used to implement various features described herein.

Having described an example communication network shown in FIG. 1 in which various features described herein may be implemented, an example computing device as shown in FIG. 2 will be described.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images, video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
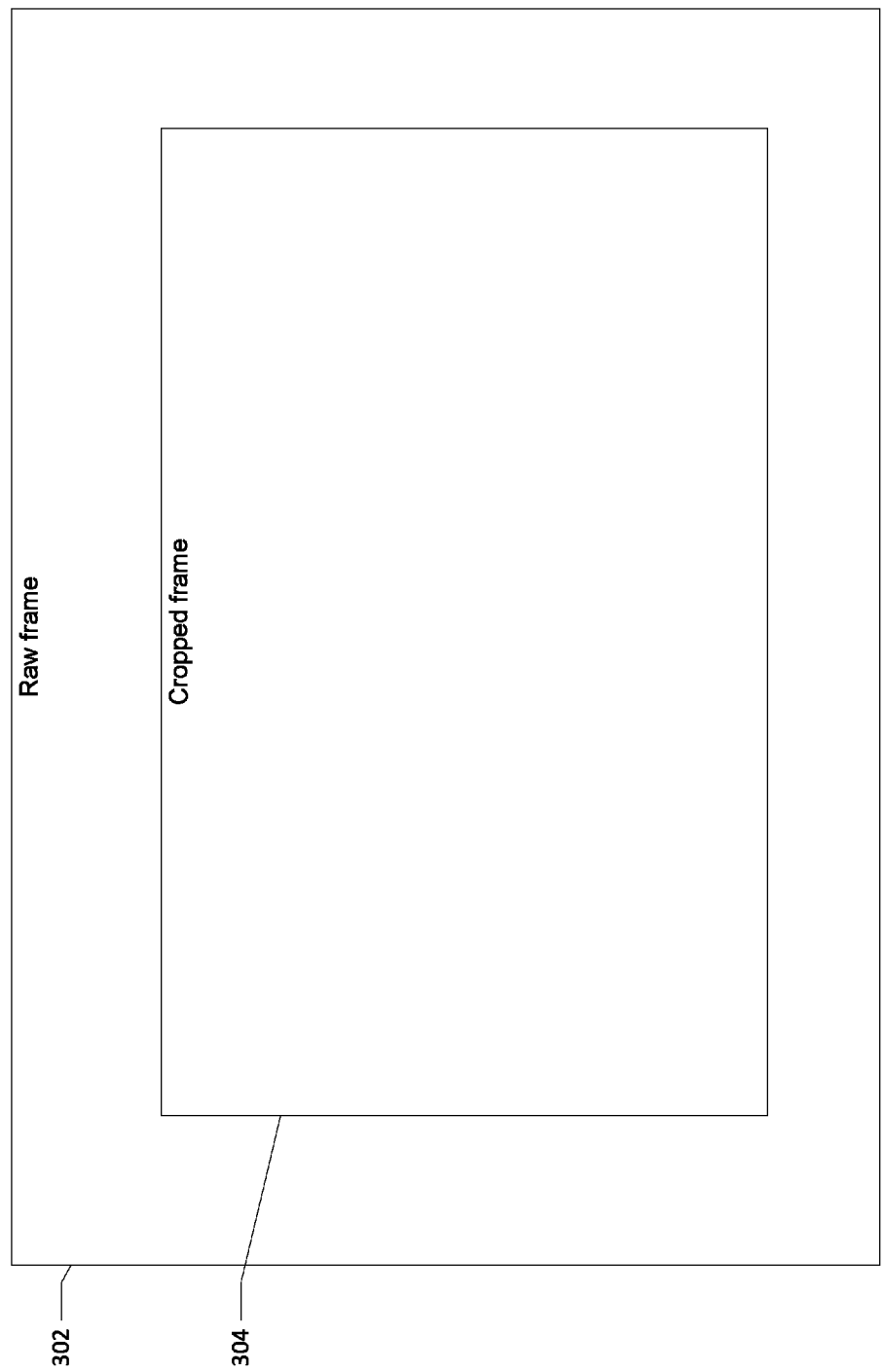
FIG. 3 illustrates an illustrative content frame with a cropped portion, which may be used according to various features described herein.

FIG. 3 illustrates one way in which video content is sometimes cropped by a display device, or otherwise not fully displayed by the display device.

For example, a video camera may capture video that includes a series of frames sized similarly to raw frame 302. Raw frame 302 may comprise a first set of dimensions. For example, raw frame 302 may be standard definition, high definition, 4K, ultra-high definition, or some other standard.

Cropped frame 304 represents a frame that may be similar to a frame displayed by a display device. Cropped frame 304 may conform to a same or different standard or resolution than the raw frame 302. For example, if raw frame 302 is a frame of a 4K video (e.g., 4096×2160 resolution with an aspect ratio of 19:10), and a display device displaying cropped frame 304 is only capable of displaying high definition video (e.g., 1920×1080 resolution with an aspect ratio of 16:9), then cropped frame 304 might not include all of the picture that is in raw frame 302. Thus, cropped frame 304 may include only a portion of raw frame 302 (e.g., by cropping out a portion of the frame of raw footage). Alternatively, cropped frame 304 may include all of raw frame 302 (e.g., by reducing the resolution of the frame of raw footage).

In one example, if raw frame 302 is video captured of a football game, an editor may select a portion of raw frame 302 to pass on to viewers of the football game (e.g., viewers who are watching on a device that displays cropped frame 304. The editor may determine to crop out portions of the game (e.g., keep a portion of the frame that shows a player with the ball, but crop out a portion of the frame that shows a player on the sideline). Thus, some of the content captured by the camera that is capturing video that includes raw frame 304 might not be included in video that includes cropped frame 304.

Figure 4:
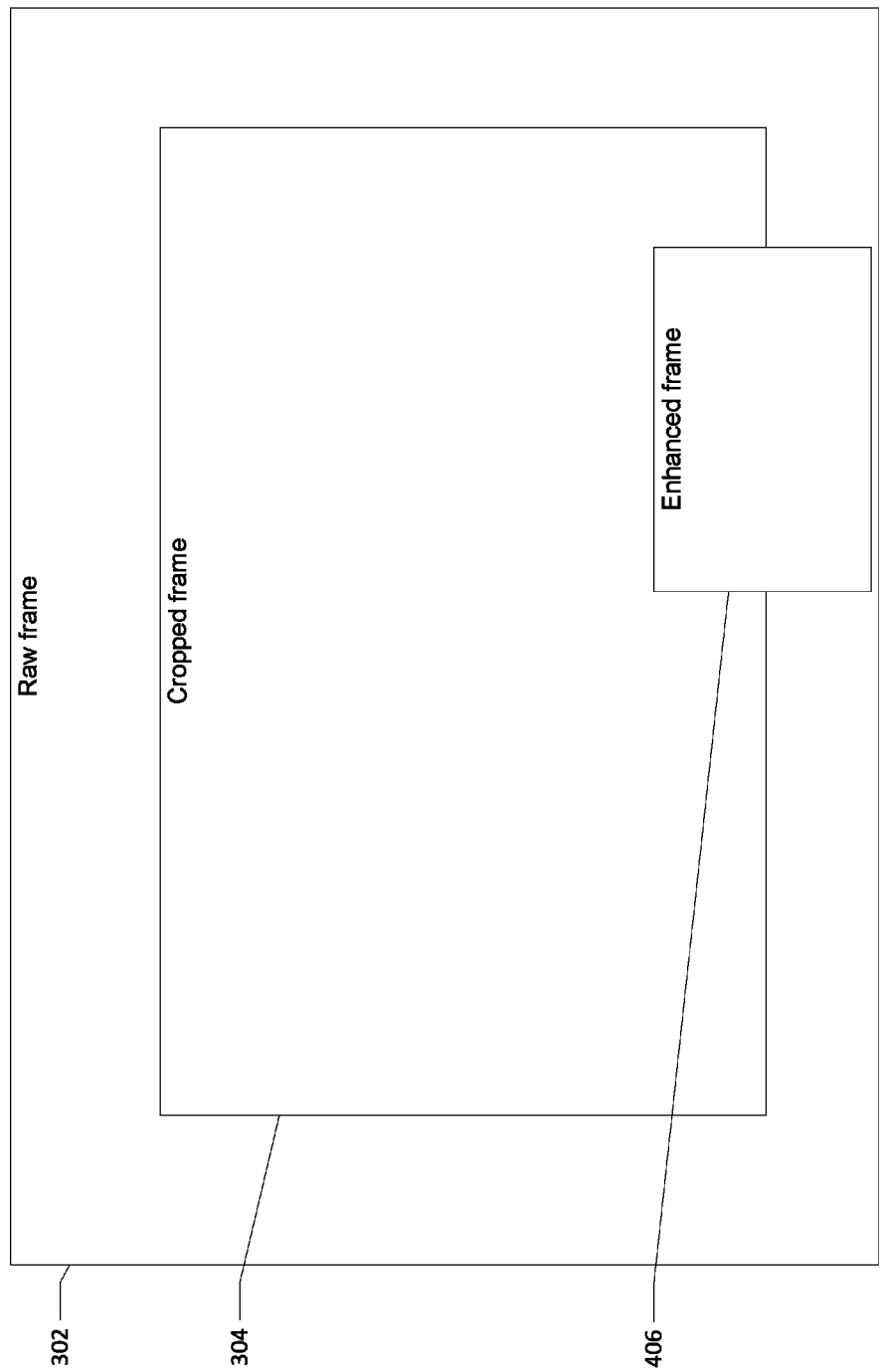
FIG. 4 illustrates an illustrative content frame with a cropped portion and an enhanced frame, which may be provided according to various features described herein.

FIG. 4 depicts one way in which a frame may be used to display additional content different from the content of a cropped frame or complementary to the content of the cropped frame.

Raw frame 302 may be similar to raw frame 302 described in connection with FIG. 3. Cropped frame 304 may be similar to cropped frame 304 described in connection with FIG. 3.

One or more additional frames (e.g., enhanced frame 406) may be produced or generated from raw frame 302. For example, as depicted, cropped frame 304 and enhanced frame 406 may each include different portions of raw frame 302. Alternatively, enhanced frame 406 may comprise portions of raw frame 302, but no portions of cropped frame 304. In another example, there may be multiple enhanced frames similar to enhanced frame 406 (e.g., frames comprising different portions of raw frame 302).

Enhanced frame 406 may include all or a portion of raw frame 302 that is also included in cropped frame 304. Alternatively, enhanced frame 406 might not include any portion of raw frame 302 that is included in cropped frame 304.

Enhanced frame 406 may be displayed on a device different than a device displaying cropped frame 304. For example, a second display device, such as a computer, laptop, television, smartphone, tablet, handheld, or other device may display enhanced frame 406, while a primary display device, such as a different computer, laptop, television, smartphone, tablet, handheld, or other device, may display cropped frame 304.

Enhanced frame 406 may be displayed on a device that is also displaying cropped frame 304. For example, a television or other display device may include picture-in-picture display, a split-screen display, a display grid, or another method of display that allows the display device to display cropped frame 304 and enhanced frame 406.

In some embodiments, a display device may switch between different frames. For example, a display device may switch between different views, where each different view includes one or more frames. For example, a first view may include cropped frame 304, a second view may include enhanced frame 406, a third view may include a second enhanced frame different from enhanced frame 406, a fourth view may include a third enhanced frame different from the second enhanced frame and enhanced frame 406, and so on. Thus, in some embodiments, there may be multiple enhanced frames 406 (e.g., each showing a different portion of raw frame 302).

Therefore, to continue the football game example described above in connection with FIG. 3, enhanced frame 406 may include a portion of raw footage that was captured by a camera at the football game, but edited out of the standard or mass-produced version of the football game (e.g., cropped frame 304). Thus, a user may be interested in viewing a portion of the football field that is not within cropped frame 304. By allowing the user to receive enhanced frame 406, the user's experience may be enhanced. For example, if user's favorite player is not currently on the field, and cropped frame 304 only shows the field, the user may be able to view the user's favorite player by receiving enhanced frame 406, which may show the user's favorite player sitting on the sidelines.

In some embodiments, a system may receive a request to track one or more particular persons in content. For example, a user may provide a request to track a particular athlete in a sporting event, an actor in a show, a competitor in a competition, or the like. The user may provide a selection via a remote control, tablet, smartphone, television, or other device. The system may receive the selection. A raw version of the content may include the particular person. The system may identify a subset of the raw version of the content that includes the particular person, based on the received selection. The system may then transmit an enhanced view of the subset of the content, which may include transmitting the subset of the content to a different device than a device displaying the content. Thus, for example, the user may select the user's favorite player for a football game being displayed on the user's television. The user's television, tablet, smartphone, or other device may, in response to the selection, receive video that may be a different view or angle of the game being displayed on the user's television, where the different view or angle includes the user's favorite player in the football game.

In some embodiments, the system may determine metadata associated with the particular person or object. For example, a user may use an app on the user's smartphone to identify the particular person. The app may identify the person using metadata. A raw version of the content may be indexed according to which persons appear in which frame. Therefore, when receiving the request to follow the particular person in the content, the system may match the request from the user (which may include metadata) to metadata corresponding to each frame of the raw content to identify frames or portions of the raw content that include the particular person. The system may then extract or generate enhanced versions of the content to provide to the user that include the particular person.

In some embodiments, there may be preset feeds or versions of enhanced content. For example, a service provider may automatically generate a feed or version of enhanced content that follows a particular player in a football game. The service provider may generate a plurality of predetermined feeds or versions, each predetermined feed or version corresponding to a particular person or object in the content. Thus, a user with multiple favorite players may view the plurality of feeds or versions, e.g., via different transmissions or in a same transmission, to follow each of the user's multiple favorite players.

In some embodiments, the system may determine what portion of the content to deliver as enhanced content based on an input from a device, e.g., on a camera in a device (e.g., an image captured by a camera of a user device, such as a tablet or a smartphone). In some embodiments, the system may include, for example, one or more of a computer, a set-top box, a server, a tuner, a digital video recorder, a laptop, a tablet, a smartphone, or the like. In some embodiments, the system may determine a portion of a screen being viewed by the user by using one or more cameras to track the eye movements of the user. Based on the eye movements of the user, the system may determine which portion of the content the user is focused on, or wants to see more of, and may deliver that portion of the content as enhanced content. In some embodiments, the user may use a touch sensitive screen, laser, infrared signal, remote control, or other device to point to a desired portion of a display. An enhanced version of the content may be delivered based on the portion of the display selected or pointed to by the user.

In some embodiments, a user may provide one or more preferences for enhanced versions of content. For example, a user may indicate one or more preferences in a user profile. A system may store multiple user profiles, each corresponding to a user of the system. Each user profile may include one or more preferences for enhanced versions of content. A user preference for enhanced content may include a method of selecting, receiving, formatting and/or displaying enhanced content. For example, a user may prefer to receive enhanced content on one device versus another, e.g., on a television but not on a mobile device, while a different user may prefer to receive enhanced content on a mobile device but not on a television. A third user may prefer to receive enhanced content on both a television and a mobile device, while a fourth user may prefer not to receive enhanced content. In another example, a user preference may indicate a method for displaying enhanced content. For example, enhanced content may be displayed as picture-in-picture, split screen, on a second-screen device, and the like. In another example, a user preference may indicate content that the user prefers to receive as enhanced content. For example, a user may prefer to view enhanced content that includes a particular person, place, or thing. The system may suggest preferences to the user based on the user's viewing history, the user's other preferences, or popular preferences, or the like.

Figure 5:
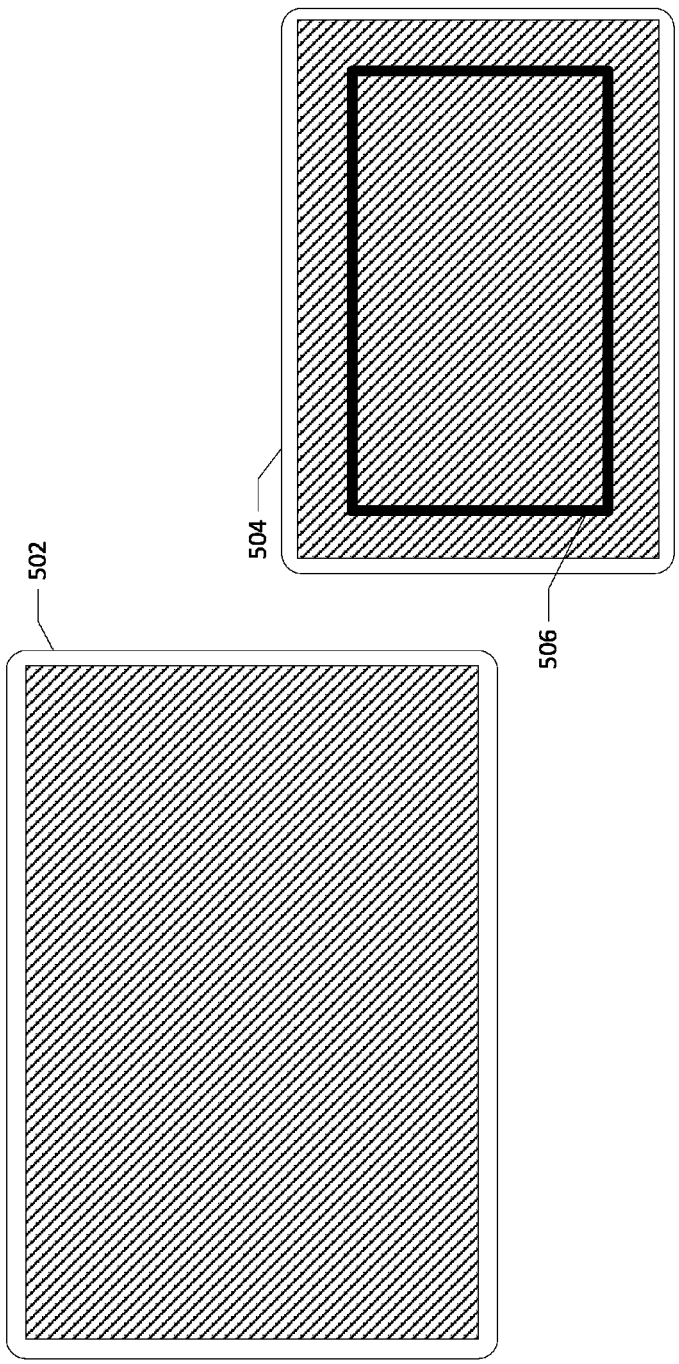
FIG. 5 illustrates an example user interface for a first device that may indicate a portion of content being displayed on a second device, according to various features described herein.

FIG. 5 illustrates one way in which two devices may show different portions of raw footage.

Device 502 (e.g., a television) may show a first portion of raw footage (e.g., a cropped portion of raw footage). For example, device 502 may show a cropped portion of raw footage similar to cropped frame 304.

Device 504 (e.g., a tablet) may show a different portion of raw footage than the portion of raw footage displayed by device 502. For example, device 504 may display all of raw frame 302, or a different or additional portion of raw frame 302 than cropped frame 304.

Device 504 may, in some embodiments, show an indicator (e.g., a box, a line) of what portion of the raw footage is being displayed on device 502. For example, indicator 506 may indicate what portion of raw footage is being displayed on device 502. In one example, if device 502 is displaying a standard or mass-produced version of content, and device 504 is displaying a raw (e.g., uncropped) version of the content, indicator 506 (e.g., an overlay, a box, a line) may indicate what portion of the raw version of the content being displayed on device 504 corresponds to the standard or mass-produced version of the content being displayed on device 502.

A description of one exemplary system that includes device 502 and device 504 follows. Device 504 and device 502 may be connected to the same network. The system may determine (e.g., by receiving a message from a computer, a server, and/or device 502) that device 502 is displaying content, e.g., a picture or video. Device 504 may have the ability (e.g., via an application, an operating mode, or a feature) to display a different or additional portion of raw footage than is being displayed on device 502. For example, device 504 may include an application from a content or data service provider, which may allow for device 504 to display the same content or different content than is being displayed by device 502. Device 504 may receive a request (e.g., from a user) to display different or additional footage than is being displayed on device 502. For example, device 504 may be displaying the same content as device 502, and the user may input a request to zoom out (e.g., a pinch, scrolling a scroll wheel, dragging on a touch-sensitive input device, etc.). After receiving the request, the portion of raw footage that is being displayed by device 502 may be expanded to include an additional portion of raw footage beyond the cropped footage being displayed on device 502. For example, the initial portion of footage being displayed may be identified (e.g., based on coordinates, a resolution, a number of pixels, etc.). The identified portion may be transmitted to a server. The server may prepare a stream with additional information (e.g., an additional portion of raw footage beyond the initial (e.g., cropped) portion of footage. The additional portion of footage may be transmitted for display on device 502. In some embodiments, as described above, device 504 may display an indicator (e.g., a box, a line, an outline, an overlay) of what portion of the raw footage is being displayed by device 502.

Device 504 may receive a request to display a different portion of the raw footage. For example, a user may request (e.g., pinch, spread fingers, drag the picture, etc.) to zoom in or pan over to a portion of raw footage that is not being displayed by device 502. For example, the user may request to display a portion of the raw footage that is similar to enhanced frame 406. When displaying enhanced frame 406, device 504 may display an indicator (e.g., a line, a box, an overlay) of where cropped frame 304 ends in relation to enhanced frame 406, or device 504 might not display the indicator of where cropped frame 304 ends.

Figure 6:
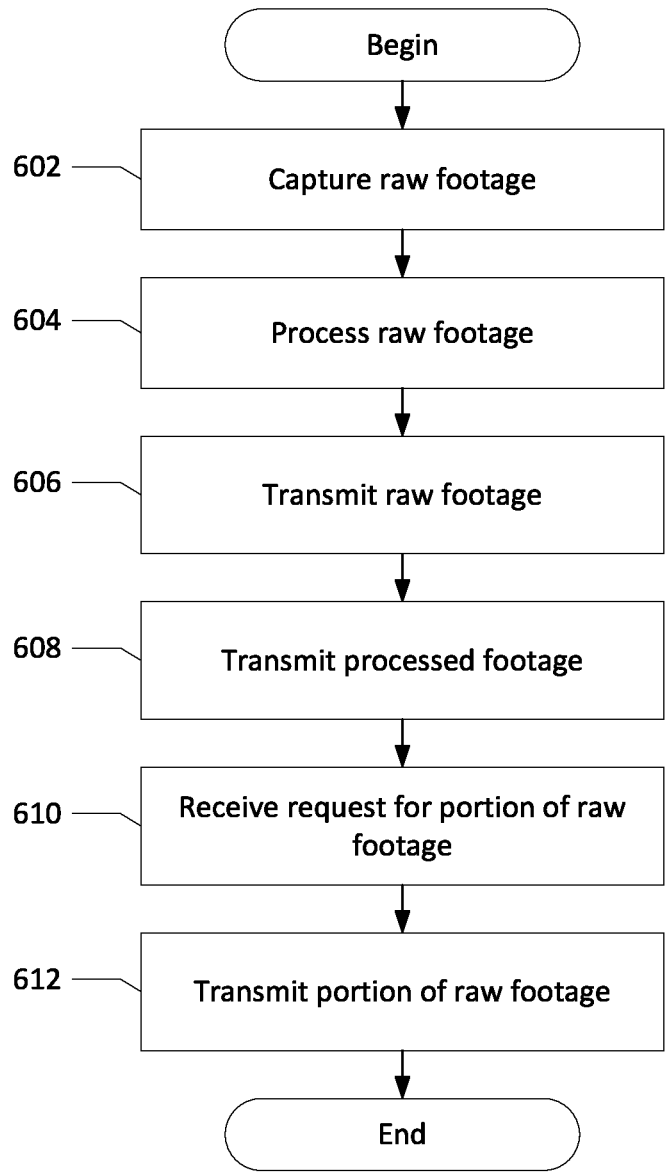
FIG. 6 illustrates an example process flow for implementing various features described herein.

FIG. 6 is a flowchart of one illustrative method that may be used for providing enhanced video.

In step 602, a camera may capture raw footage. For example, at a sporting event (e.g., a football game), one or more cameras may capture video, which may be fed to a production truck. The cameras may capture footage at a high resolution.

In step 604, one or more computing systems may process the raw footage. For example, at the football game production truck, an editor (e.g., a computer, a human) may select all or a portion of footage from the one or more cameras to use in a standard or mass-produced version of content. The editor may select to crop a portion of the video received from the one or more cameras before using that video in the standard or mass-produced version of the content. For example, if a camera is capturing a wide-angle view of the entire field, and only a portion of the field has play action, the editor may crop (e.g., digitally zoom) in on the portion of the raw footage that shows the play action. Thus, the transmission of content may include a cropped portion of the raw footage received from the camera with the wide-angle view of the field.

In step 606, the one or more computing systems may transmit the raw footage (e.g., to a headend, to a content server, to a user device, etc.). The raw footage may be processed to result in processed footage. For example, during the processing, the raw footage may be cropped, edited, filtered, resized, or otherwise altered. In some embodiments, a camera may capture a 4K video or image. The 4K video or image may be cropped or digitally zoomed, to result in, for example, a high-definition video or image (e.g., 1080p, 1080i, 720p, 720, etc.). The original raw footage may be stored, and/or the processed footage may be stored. Information (e.g., metadata) may be generated and/or stored in connection with the processing to identify what processing occurred to the raw footage. For example, information may identify the portion of the footage that was zoomed in on or cropped during the processing.

In step 608, the one or more computing systems may transmit the processed footage. This step may be performed together or separately with step 606 (e.g., the one or more computing systems may transmit the raw footage together with the processed footage, or the one or more computing systems may transmit the raw footage separately from the processed footage). The raw footage may be stored together with or separately from the processed footage. In some embodiments, the raw footage may be transmitted with metadata indicating which portion of the raw footage should be used as the processed footage. In other embodiments, the raw footage may be transmitted, and the processed footage may also be transmitted.

In step 610, a computing device (e.g., a content server) may receive a request for additional information (e.g., additional video, audio, and/or data) related to footage being displayed on a different device. For example, a first device (e.g., a television) may be displaying particular footage, and a user may use a second device (e.g., a tablet, a smartphone) to request additional information related to the particular footage.

In step 612, the computing device may transmit the requested additional information. For example, the computing device may transmit to the requesting device all of the raw footage related to the particular footage being displayed on the different device. Alternatively or additionally, the computing device may transmit to the requesting device different footage, metadata, text, pictures, advertisements, video, or other information related to the footage being displayed on the different device. For example, if a user is viewing a football game on a television, the user may request to view on a tablet additional footage captured by a camera filming the football game. The television may display a standard or mass-produced video of the game (e.g., focusing on the play action). The tablet may receive, in response to the user's request, a different angle, view, or portion of video captured by one or more cameras filming the football game (e.g., the additional information may include footage that was partially or completely cropped out during the processing of the raw footage to generate the standard or mass-produced version of the game). Thus, a second-screen device (e.g., tablet) may receive access to some or all portions of raw footage that might not otherwise be available for viewing by a user. Alternatively, two or more transmissions (e.g., one or more streams or videos based on the additional information, and the standard or mass-produced version) may be displayed simultaneously on one user device.

Figure 7A:
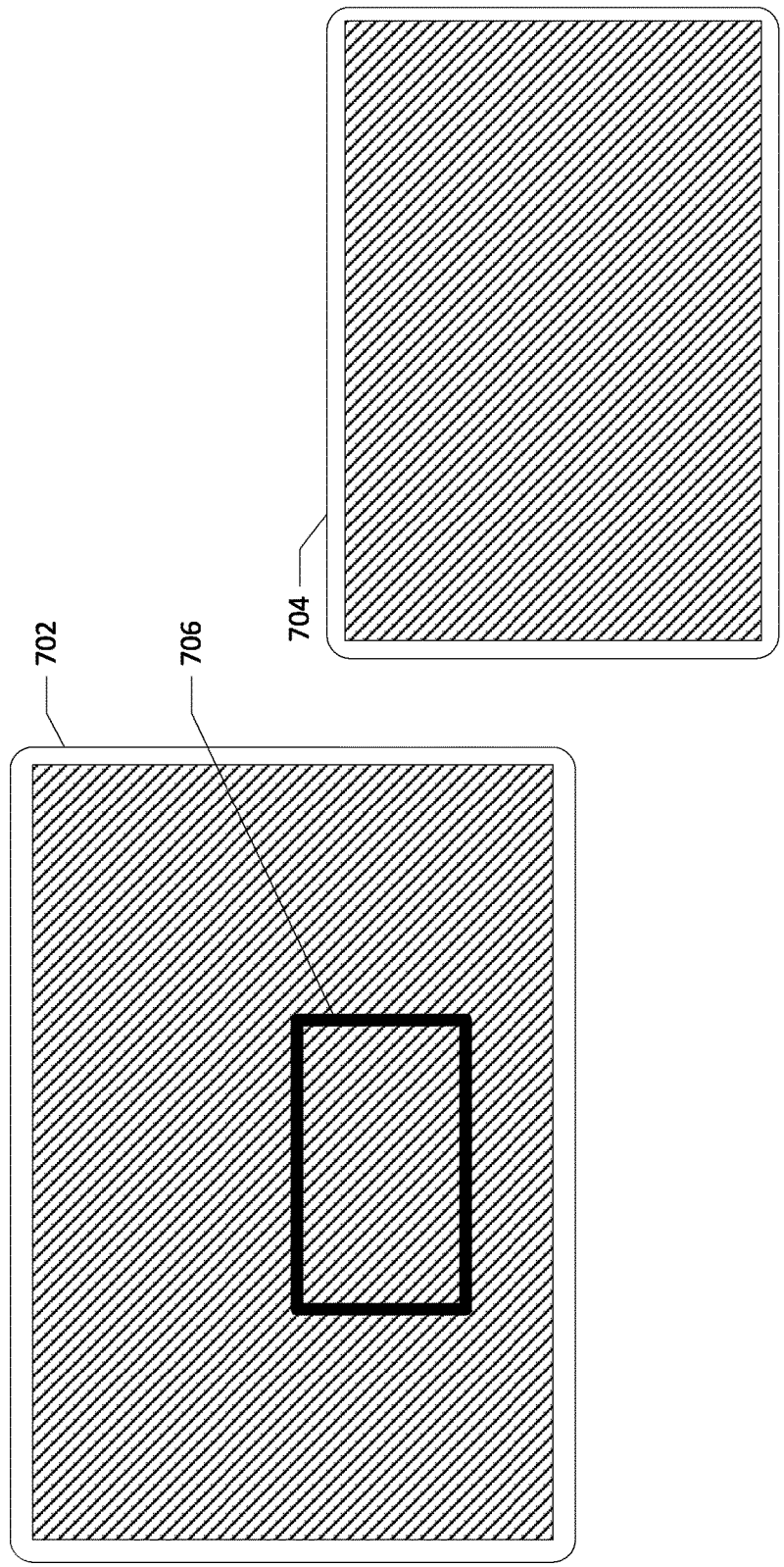
FIG. 7A illustrates an example user interface for implementing various features described herein.

FIG. 7A illustrates a way in which two different devices may display different portions of content.

Device 702 may display a first portion of content. For example, device 702 may be a television that displays a basic version of content that was created for mass viewing.

Device 704 may display a second portion of the content that is being displayed on device 702. For example, device 704 may be a tablet that displays a same or different portion of the content being displayed on the television.

For example, one device, such as a smartphone or tablet, may be used to zoom in on the content being displayed on another device, such as a television. For example, a user may use a tablet's camera to zoom in on a television to get a better view of what is being displayed on the television. When zooming in using the tablet's camera, however, the zoomed portion of the content might not be displayed as clearly as the content is displayed on the computer. This is because as the tablet's camera zooms in on the content being displayed on the television, the zoomed-in portion contains the same number of pixels, but those pixels are progressively spread across a greater screen size as the tablet's camera zooms in. Furthermore, the camera might not capture a high-quality image of the content. Thus, the resolution and the quality of the content decrease.

Device 704 may, however, request and receive similar content to the content being displayed on the television, but may request and receive the content from a content source (e.g., a content provider or content server), rather than using the tablet's camera. A user may use device 704 (e.g., via an application, an operating mode, a feature) to request to zoom in on a portion of the content (e.g., pinch, spread fingers, drag the picture, etc.). For example, the user may use a camera of device 704 to zoom in on content. Device 704 may determine that the camera of device 704 is being used to zoom in on content being displayed on a different device (e.g., a television). Device 704 may determine what portion of the content is being zoomed in on (e.g., a section or quadrant or half of the screen, a particular portion of a frame, etc.). In some embodiments, a device other than device 704 (e.g., a processing server) may determine what portion of the content is being zoomed in on. Device 704 may generate and a request (e.g., to a content server) for an enhanced (e.g., a high resolution) version of the zoomed-in portion of the content. The request may include information regarding one or more of what content is being viewed, what portion of the content and/or screen is being zoomed in on (e.g., a picture and/or video captured by device 704, the picture and/or video including the screen of the television displaying the content), a geophysical location of device 704 and/or the television, a network location of device 704, subscription and/or user information for a user of device 704, and the like. Device 704 may receive, in response to the request, a high-resolution stream of the content and/or the zoomed-in portion of the content, which device 704 may use to display a higher quality version of the zoomed-in content.

For example, if the content is being displayed at 1920×1080 resolution on the television, and the user requests to zoom in on a portion of the content that is a width of a third of the screen (e.g., 640×380), the content server may provide that portion of the content (e.g., the zoomed-in portion of the content) at full resolution (e.g., at 1920×1080), which may allow the tablet to display the zoomed-in portion of the content at the same resolution as the full-screen version of the content. Specifically, a content server may store a higher-resolution version of the content than is being transmitted to the television. For example, content server may store a version of the content that is in 4K or higher resolution. If the television is only capable of displaying 1920×1080 resolution, however, the content may be transmitted to the television at 1920×1080 resolution. But when the tablet requests the zoomed-in portion of the content, the content server may provide the zoomed-in portion of the content to the tablet at a resolution that the tablet is capable of displaying (e.g., 1920×1080). Thus, because the tablet may display a zoomed-in portion of the content at a same resolution as the original non-zoomed content, a user may have an enhanced viewing experience.

In some embodiments, device 702 may display an indicator of which portion of the content is being displayed on device 704. For example, if device 704 is displaying a zoomed-in portion of the content being displayed on device 702, device 702 may include an overlay indicator (e.g., a box, a line) such as overlay indicator 706, which may indicate which portion of the full-frame content is being displayed on device 704. An application on device 702 may allow a user to select (e.g., in a setting, in a user profile) whether to display overlay indicator 706. Thus, a user may easily identify which portion of the content is being displayed on device 704.

In some embodiments, device 704 may use a camera of device 704 to determine which portion of the display of device 702 to display. For example, if device 704 is a tablet, a user may hold up the tablet to use the camera to capture the display of device 704 (e.g., a television). The user may request (e.g., pinch, spread fingers, outline a box, circle a portion, etc.) to zoom in on the display of device 704. The tablet may display a zoomed-in portion of the content, which may be received from a server as described above. In some embodiments, the tablet may initially display a zoomed-in portion of the content that is received from the tablet's camera. The tablet may transmit a request to the content server for a higher-resolution version of the content. The request may include an indicator of what portion of the content is zoomed in on. For example, the request may include an image captured by the tablet's camera, information from the tablet's GPS, accelerometer, gyroscope, BLUETOOTH, WIFI, other sensors or radios, and the like. The content server or other computing device may use the information received from the tablet to determine which portion of the content is being zoomed in on by the tablet, which portion of the content is being displayed by the television, a distance of the tablet from the television, etc. The content server may, as described above, provide an enhanced version of the zoomed-in content to the tablet, which may receive and display the enhanced portion of the content. Thus, in the user's experience, the user may use the tablet to zoom in on a portion of the display, which may initially be a lower resolution (e.g., because the displayed content is the zoomed-in portion of the content captured by the tablet's camera), but then may switch over to a higher-resolution version of the zoomed-in content (e.g., because the tablet receives an enhanced version of the content from the content server).

If the user pans around on the tablet, (e.g., by dragging the video around with a finger or a stylus, by pointing the camera of the tablet at a different portion of the television, etc.), the tablet may request and the content server may transmit a corresponding different portion of the content. In some embodiments, the content server may transmit a greater portion of the enhanced frame than is necessary for display. For example, the content server may transmit a buffer zone around the enhanced frame, so that if the user pans around (e.g., by not holding the tablet completely still, resulting in camera movement, by dragging around on the display, etc.) the user experience might not be interrupted. For example, if the user points the tablet's camera at a portion of the television that is to the right of the originally requested enhanced frame of the content being displayed on the television, the tablet may display a corresponding zoomed-in portion of the content. Because the content server has transmitted a buffer zone around the enhanced frame, the user might not experience a loss in quality as the zoomed-in portion of the content pans to the right.

In some embodiments, if the buffer does not have information that includes all of the new portion of the content requested by the tablet (e.g., the user rapidly moves the tablet to point at a completely different part of the television), the tablet may display a zoomed-in portion of the content where a part of the zoomed-in portion is at high resolution (e.g., because it was in the buffer zone or the original enhanced frame), and a another part of the zoomed-in portion is captured by the tablet's camera. As described above, once the tablet receives the high-resolution version of the zoomed-in portion of the content (e.g., an enhanced frame), the tablet may display the enhanced frame instead of the zoomed-in content captured by the tablet's camera.

Figure 7B:
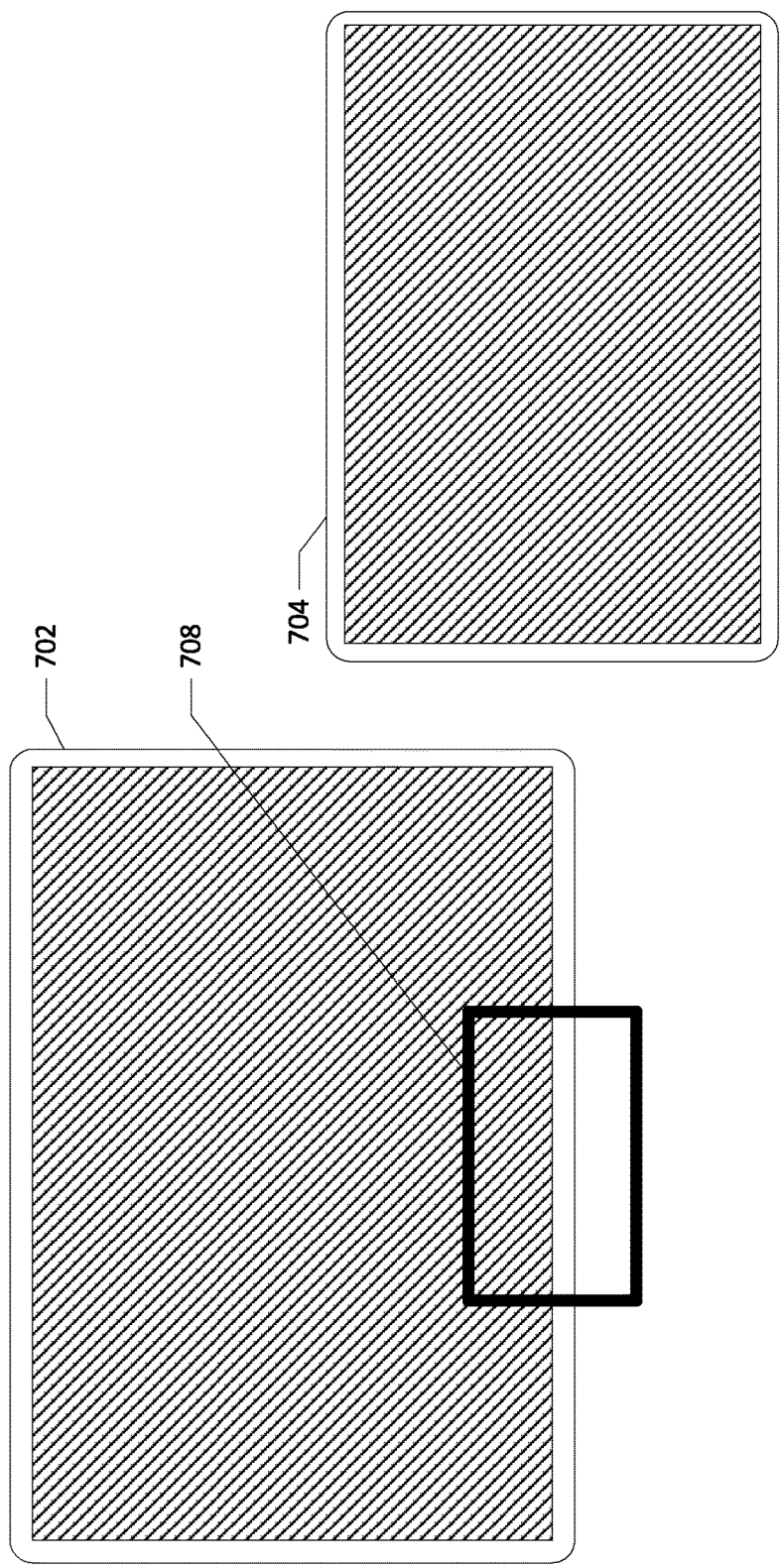
FIG. 7B illustrates an example embodiment that may implement various features described herein.

FIG. 7B illustrates a way in which two different devices may display different portions of content.

As discussed above in connection with FIG. 7A, device 702 may display a first portion of content. For example, device 702 may be a television that displays a standard or mass-produced version of content (e.g., a show, movie, sporting event, etc.). Device 704 may display a second portion of the content that is being displayed on device 702. For example, device 704 may be a tablet that displays a same or different portion of the content being displayed on the television.

With regard to FIG. 7B, a tablet may be used to zoom in on content being displayed on the television. For example, a camera of the tablet may be used to zoom in on portion 708 of the content. As seen in FIG. 7B, the portion 708 of the content may include an edge of the content. The tablet may transmit an image captured by the camera of the tablet to a content server, which may transfer an enhanced version of the content to the tablet. The enhanced version of the content may include additional content not displayed on the television. For example, the television may display content corresponding to cropped frame 304, and the tablet may receive enhanced content, which may correspond to enhanced frame 406, which may include a portion of raw frame 302 that might not be included in cropped frame 304. Therefore, the tablet may receive and display additional content beyond the edge of the content being displayed on the television.

In some embodiments, as a user moves device 704, the camera of device 704 may capture a different portion of the content being displayed by the device 702. Device 704 may transmit an updated image captured by the camera, and receive an updated enhanced version of the content. For example, device 704 may capture and transmit an image according to a predetermined schedule (e.g., every second, every tenth of a second, etc.). In some embodiments, device 704 may transmit a streaming video captured by the camera. The streaming video may be used to determine a portion of the content that corresponds to the streaming video, and an enhanced version of the portion of the content may be received in response.

In some embodiments, an image or video captured by device 704 might not be displayed on device 704. In some embodiments, the image or video captured by device 704 may be displayed on device 704, but may be replaced by a display of an enhanced version of the content after the enhanced version of the content is received by device 704.

Figure 8:
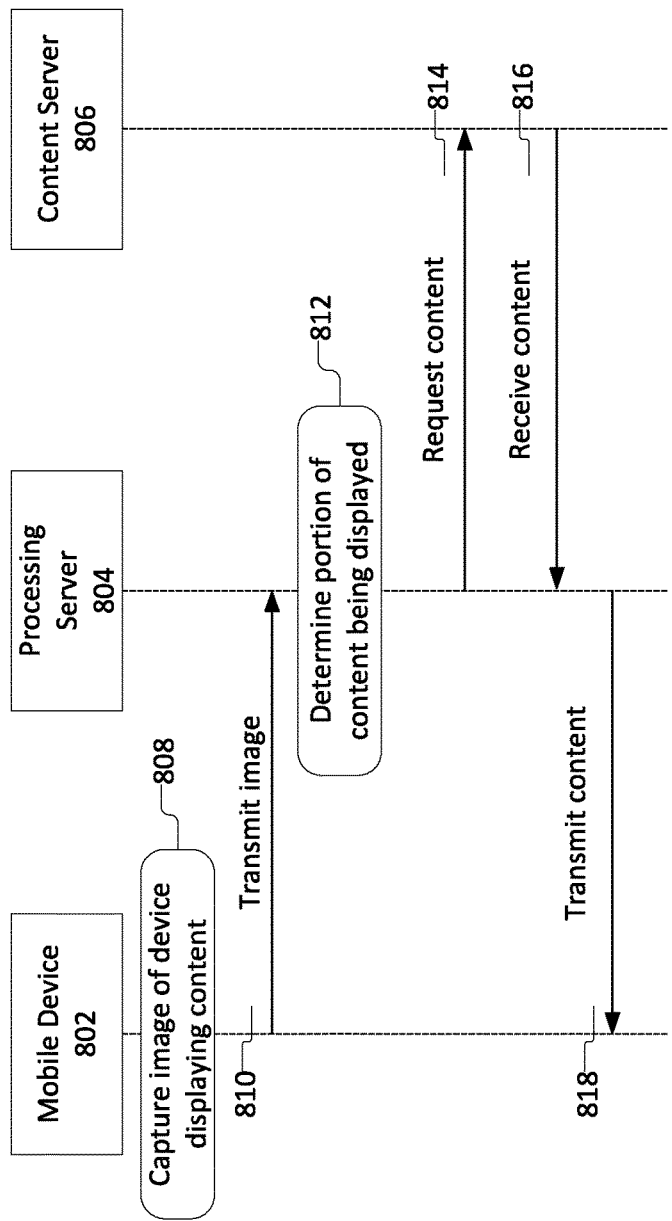
FIG. 8 illustrates an example process flow for implementing various features described herein.

FIG. 8 is a flow diagram of an illustrative system 800 for displaying an enhanced frame, as described herein. System 800 may include one or more computing devices, including user device 802, processing server 804, and content server 806.

In step 808, user device 802 may capture an image of a device displaying content. For example, user device 802 may be a mobile device such as a tablet or a smartphone that may capture an image of a different display device (e.g., a television) displaying content. The captured image may be a zoomed-in portion of the content displayed on the different display device. The content being displayed on the different display device may be transmitted by the system using a multicast signal, a broadcast signal, a unicast signal, a narrowcast signal, or another type of signal. For example, if a user is viewing enhanced content on a computing device (e.g., a tablet, a smartphone, etc.), the enhanced content may be delivered via a data network (e.g., the Internet, Wifi, cellular, Ethernet, etc.), which may be unicast, multicast, broadcast, narrowcast, or another signal type.

In step 810, user device 802 may transmit the captured image to processing server 804. User device 802 may also transmit additional information, such as a network that user device 802 is connected to (which may be a same network as the different display device is connected to), authentication credentials, a timestamp of the image (e.g., image capture time), etc.

In step 812, processing server 804 may determine a portion of content being displayed. For example, processing server 804 may determine that user device 802 is on the same network as the different display device, and may determine the content being displayed by the different display device. The processing server 804 may then determine which portion of the content being displayed by the different display device corresponds to the image received in step 810. In another example, processing server 804 may use an image-matching or image-searching solution to search one or more content databases to determine what content the image corresponds to. For example, processing server 804 may determine an image signature or image fingerprint of the image, then use the image signature or image fingerprint to search for an image signature or an image fingerprint corresponding to the image signature or image fingerprint of the image. For example, processing server 804 may use the image signature or image fingerprint to search in a database for a corresponding signature or fingerprint for a frame from a piece of known content. The processing server 804 may then determine that image received from the user device 802 is an image from the piece of known content.

In step 814, processing server 804 may request content from content server 806. Processing server 804 may request an enhanced version of the content based on the content identified by processing server 804 using the image received from user device 802. Alternatively or additionally, processing server 804 may request a raw, enhanced, or unenhanced version of the content identified in step 812 (e.g., the known content). The request for content may include information about the content (e.g., identifying information), a particular portion of content (e.g., a particular timespan of the content, a particular portion of the screen of the content), a particular resolution, a particular format, etc.

In some embodiments, the system may identify a predetermined or pregenerated enhanced version of content that matches or substantially matches a portion of the content requested by the user, and may deliver the predetermined or pregenerated enhanced version of the content to the user.

In step 816, processing server 804 may receive the requested content from content server 806. In some embodiments, content server 806 may transmit an enhanced version of the content to processing server 804. For example, content server 806 may extract the requested portion of the content from a stored version of the content. In some embodiments, content server 806 may convert the content to a requested format, resolution, etc. In some embodiments, content server 806 may retrieve and transmit a raw or unenhanced version of the content to the processing server 804. In some embodiments, content server 806 may transmit the requested content directly to user device 802.

In some embodiments, after receiving the content from content server 806, processing server 804 may perform processing on the content. For example, if processing server 804 receives an unenhanced or raw version of the content, processing server 804 may perform processing on the content. For example, processing server 804 may extract the requested portion of the content from a stored version of the content. In some embodiments, processing server 804 may convert the content to a requested format, resolution, etc.

In step 818, processing server 804 may transmit the content to user device 802. In some embodiments, processing server 804 may transmit an enhanced version of the content to user device 802. In some embodiments, the enhanced version of the content may be transmitted via a narrowcast signal. For example, each user may receive a customized version of the enhanced content according to a request made by each user. In some embodiments, the enhanced version of the content may be transmitted via a broadcast or multicast signal. For example, if multiple users request similar enhanced content, the similar enhanced content may be provided to the multiple users using a broadcast signal. In another example, the system may provide a plurality of enhanced versions of content using a respective plurality of different broadcast signals. After identifying a particular enhanced version of content desired by a user, the user may receive the particular enhanced version of the content by received one broadcast signal of the plurality of broadcast signals, where the one broadcast signal includes the particular enhanced version of the content.

The enhanced version of the content may include a high resolution version of content that corresponds to the image captured in step 808. In another example, the enhanced version of the content may include additional or different content than that in the image captured in step 808. For example, if a television displays a video that includes cropped frame 304, and the image captured by the user device 802 is at a boundary of the cropped frame 304 (e.g., the portion of cropped frame 304 included in enhanced frame 406), the enhanced content may include additional content, such as enhanced frame 406 (which may include a portion of raw frame 302 that is not included in cropped frame 304).

The system may synchronize a display of the content on a first device with a display of the enhanced view of the content on a second device. In some embodiments, synchronizing may include adjusting a playback time of a frame of the content on the first device to match a playback time of a same frame of the content on the second device. For example, the enhanced version of content may include a time-adjusted portion of content to compensate for a time delay between the capture of the image in step 808 and the transmission of content in step 818. For example, if the image captured in step 808 is an image captured by a tablet of a video playing on a television, the content delivered to the tablet in step 818 may be time adjusted to compensate for a processing delay between the capture of the image and the delivery of the content, such that a playback time of the enhanced version of the content received by the tablet corresponds to a playback time of the content being played on the television. In this manner, a device may receive an enhanced version of content that corresponds to content playing on a different device.

In some embodiments, the content being displayed on a second device may be displayed with or without sound. For example, if a tablet displays content corresponding to content being displayed on a television, the tablet and/or the television may display content with or without sound. Thus, the sound from one device might not conflict with the sound from the other device. For example, if the tablet is displaying a zoomed-in or enhanced version of content being displayed on the television, and the sound of the two different videos is the same, a user experience may be enhanced by only playing sound via one of the devices. Alternatively, if the tablet is displaying different content (e.g., supplemental commentary, a different camera feed, etc.) than the content being displayed on the television, it may be desirable for each device to play sound corresponding to the content respectively being played. In some embodiments, the user may provide a preference, setting, or indication of whether to play sound on a particular device. If the user indicates that the user does not wish to receive sound on a particular device, the device, in some embodiments, might not receive a sound for video being played on that device. Alternatively, the device may mute or not play the sound corresponding to the content being played on the device.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:
1. A method comprising:
receiving, by a computing device, a content stream comprising video frames corresponding to an image area;
transmitting, to a first user device via a multicast transmission, a first version of the content stream, wherein the first version comprises video frames corresponding to a first portion of the image area;
receiving, from a second user device, a request comprising a captured image corresponding to a portion of the first portion of the image area;
in response to the request, generating, based on the captured image corresponding to the portion of the first portion of the image area, a second version of the content stream, wherein the second version comprises video frames corresponding to a second portion of the image area, and wherein the second portion of the image area is:
different from the first portion of the image area, and centered based on the captured image; and transmitting, to the second user device via a unicast transmission, the second version of the content stream.

2. The method of claim 1, wherein the first version of the content stream is at a first resolution, and wherein the second version of the content stream is at a second resolution smaller than the first resolution.

3. The method of claim 1, comprising:
transmitting information causing synchronization of a display of the first version of the content stream on the first user device with a display of the second version of the content stream on the second user device, and wherein a playback time of the first version of the content stream on the first user device corresponds to a playback time of the second version of the content stream on the second user device.

4. The method of claim 1, wherein the request further indicates a particular person associated with the content stream, and wherein the method further comprises:
determining metadata corresponding to the particular person,
wherein the generating the second version of the content stream is based on the metadata corresponding to the particular person.

5. The method of claim 1, further comprising:
determining, based on the captured image, a first video frame of the content stream corresponding to the captured image,
wherein the generating the second version of the content stream is based on a comparison between the first video frame and the captured image.

6. The method of claim 5, further comprising:
generating, based on the comparison between the first video frame and the captured image, an overlay indicator indicating additional content cropped out of the first version of the content stream; and
transmitting, to the second user device, the overlay indicator.

7. The method of claim 1, wherein each video frame of the second version of the content stream comprises additional content cropped out of a corresponding video frame from the first version of the content stream.

8. The method of claim 1, further comprising:
transmitting, to the first user device, the second version of the content stream; and
transmitting, to the first user device, information causing the first user device to cause display of the first version of the content stream and the second version of the content stream in a picture-in-picture feature.

9. A method comprising:
capturing, by a first user device, an image corresponding to a multicast transmission of a content stream being displayed by a second user device, wherein the image comprises:
a first section of a frame from the multicast transmission of the content stream, and
a second section outside of the frame from the multicast transmission of the content stream;
transmitting, to a server, the image; and
in response to transmitting the image, receiving, from the server and based on the image, a unicast, re-centered view of the content stream.

10. The method of claim 9, wherein the unicast, re-centered view of the content stream comprises content that is cropped out of the multicast transmission of the content stream.

11. The method of claim 9, wherein the multicast transmission of the content stream is at a first resolution, and wherein the unicast, re-centered view of the content stream is at a second resolution smaller than the first resolution.

12. The method of claim 9, comprising:
receiving information causing synchronization of a display of the unicast, re-centered view of the content stream with a display of the multicast transmission of the content stream, and wherein a playback time of the unicast, re-centered view of the content stream corresponds to a playback time of the multicast transmission of the content stream.

13. The method of claim 9, wherein the unicast, re-centered view of the content stream comprises a plurality of first frames, wherein each frame, of the plurality of first frames, comprises an overlay indicator indicating the second section outside of the frame from the multicast transmission of the content stream.

14. A system comprising:
a first user device comprising:
one or more processors; and
memory storing instructions that, when executed by the one or more processors, cause the first user device to:
receive, via a multicast transmission, a first version of content;
receive, via a unicast transmission and in response to an identification of a zoomed-in portion of the first version of the content being displayed by the first user device, a second version of the content corresponding to the zoomed-in portion of the first version of the content; and
a second user device comprising:
one or more processors; and
memory storing instructions that, when executed by the one or more processors of the second user device, cause the second user device to:
transmit, to a server, the identification of the zoomed-in portion of the first version of the content.

15. The system of claim 14, wherein the instructions stored in the memory of the second user device, when executed by the one or more processors of the second user device, further cause the second user device to:
capture an image of the first version of the content being displayed by the first user device; and
wherein the instructions stored in the memory of the second user device, when executed by the one or more processors of the second user device, cause the second user device to transmit the identification by transmitting the image of the first version of the content.

16. The system of claim 15, wherein the instructions stored in the memory of the second user device, when executed by the one or more processors of the second user device, further cause the second user device to capture the image of the first version of the content by capturing an image comprising less than an entire frame of the first version of the content.

17. The system of claim 14, wherein a resolution of the second version of the content is greater than a resolution of the first version of the content.

18. The system of claim 14, wherein the instructions stored in the memory of the first user device, when executed by the one or more processors of the first user device, further cause the first user device to:
cause display of the first version of the content in a first window of a picture-in-picture feature; and
cause display of the second version of the content in a second window of the picture-in-picture feature.

19. The system of claim 14, wherein the first version of the content comprises a first portion of a frame of the content, and the second version of the content comprises a second portion of the frame of the content, and wherein the second portion of the frame of the content is different from the first portion of the frame of the content.

20. The system of claim 14, wherein the first version of content comprises a plurality of first frames, wherein the second version of the content comprises a plurality of second frames, and wherein each of the plurality of second frames comprises an enlarged portion of a corresponding frame from the plurality of first frames.

* * * * *

UNITED STATES PATENT AND TRADEMARK OFFICE
CERTIFICATE OF CORRECTION

PATENT NO. : 9,992,517 B2
APPLICATION NO. : 15/051006
DATED : June 5, 2018
INVENTOR(S) : Pinckernell et al.

Page 1 of 1

It is certified that error appears in the above-identified patent and that said Letters Patent is hereby corrected as shown below:

On the Title Page

Item [*], Notice:
Delete "days. days." and insert --days.--

In the Specification

Column 6, Line 30:
Delete "304" and insert --302--

Signed and Sealed this
Twenty-sixth Day of February, 2019

Andrei Iancu
*Director of the United States Patent and Trademark Office*